(No Model.) 3 Sheets—Sheet 1.

T. L. ARMSTRONG, E. CLARK & G. COTTRELL.
FENCE MAKING MACHINE.

No. 406,516. Patented July 9, 1889.

Witnesses,
Geo. H. Strong.
J. H. Nourse

Inventor,
T. L. Armstrong
Edw. Clark
Geo Cottrell
By Dewey & Co.
att'y (No Model.) 3 Sheets—Sheet 3.

T. L. ARMSTRONG, E. CLARK & G. COTTRELL.
FENCE MAKING MACHINE.

No. 406,516. Patented July 9, 1889.

Witnesses,
Geo. H. Strong.

Inventor,
T. L. Armstrong.
Edw'd Clark
Geo Cottrell
By Dewey & Co. attys

UNITED STATES PATENT OFFICE.

THOMAS L. ARMSTRONG AND EDWARD CLARK, OF OAKLAND, AND GEORGE COTTRELL, OF SAN FRANCISCO, ASSIGNORS TO THE UNION FENCE MANUFACTURING COMPANY, OF SAN FRANCISCO, CALIFORNIA.

FENCE-MAKING MACHINE.

SPECIFICATION forming part of Letters Patent No. 406,516, dated July 9, 1889.

Application filed July 6, 1887. Serial No. 243,595. (No model.)

*To all whom it may concern:*

Be it known that we, THOMAS L. ARMSTRONG and EDWARD CLARK, of Oakland, county of Alameda, and GEORGE COTTRELL, of the city and county of San Francisco, State of California, have invented an Improvement in Fence-Making Machines; and we hereby declare the following to be a full, clear, and exact description of the same.

Our invention relates to that class of machines which are used for making what is known as "slat fence," consisting of parallel spaced slats united by wires which are twisted between the slats and form loops for confining them.

Our invention consists in the peculiar constructions and combinations of devices, which we shall hereinafter fully describe and claim.

Figure 1:
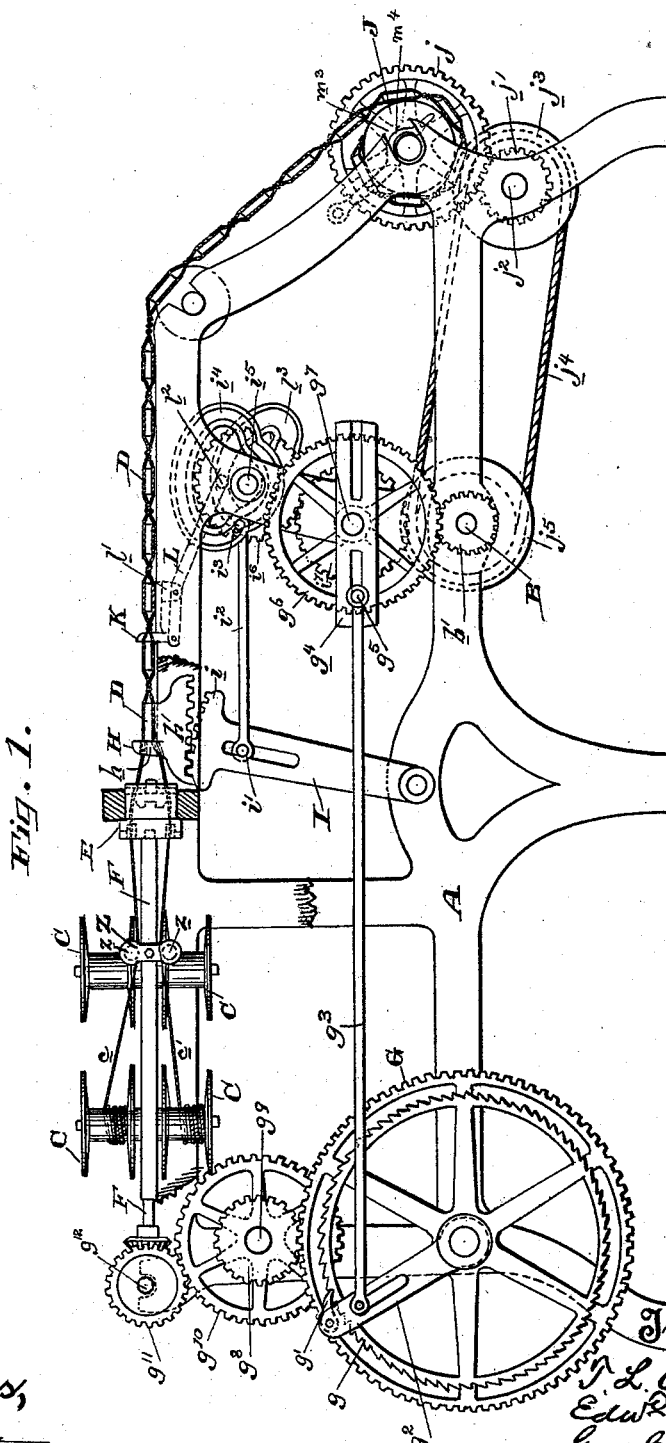
Figure 2:
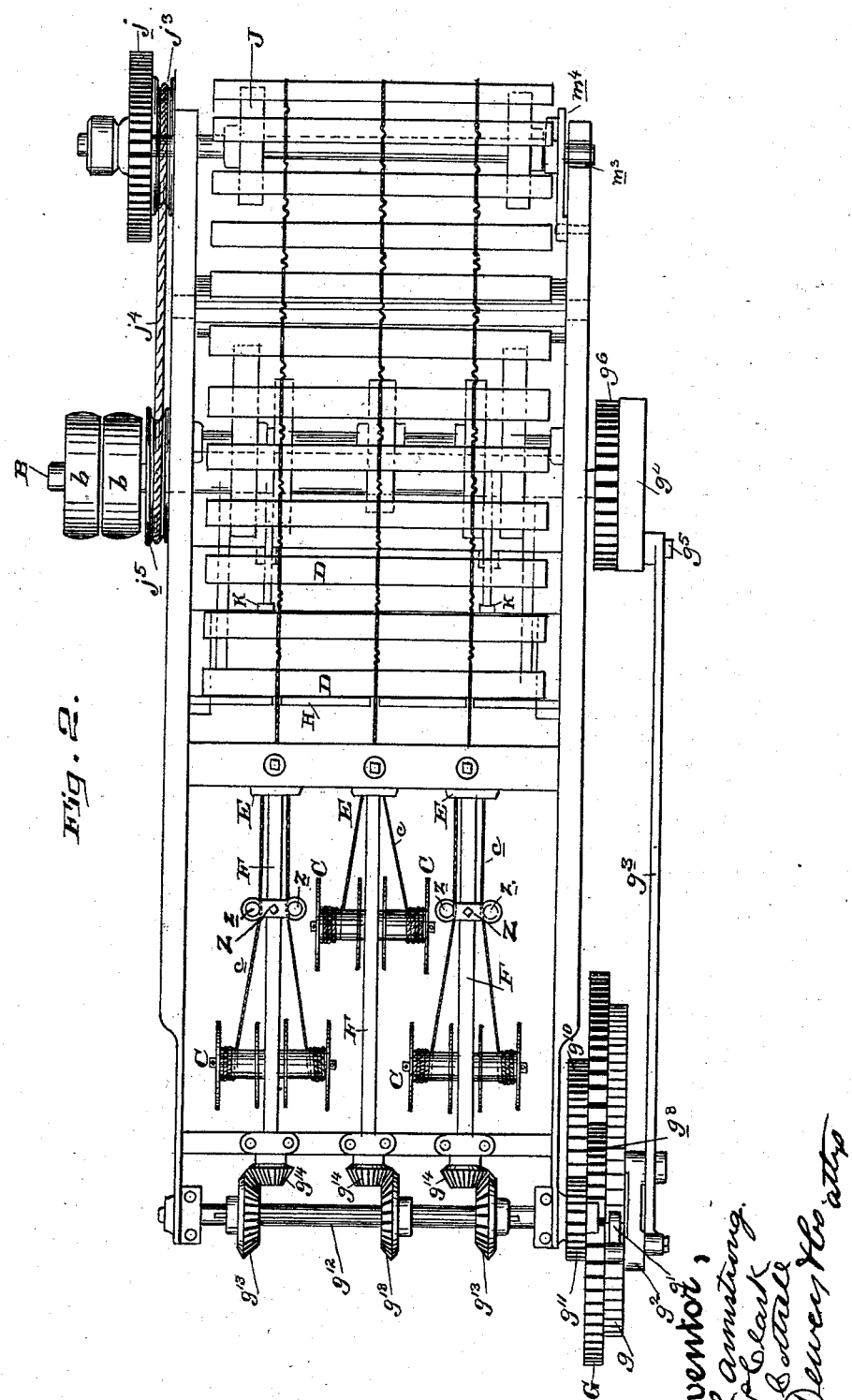
Figure 3:
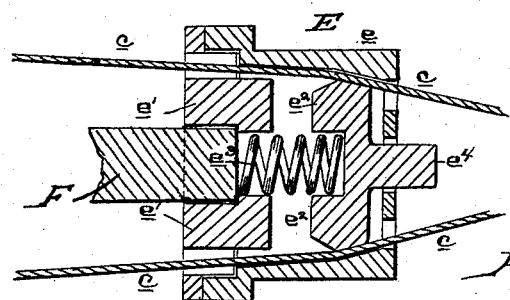
Figure 4:
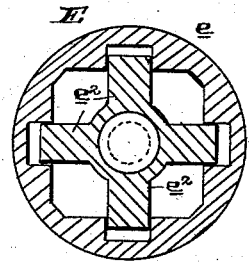
Figure 7:
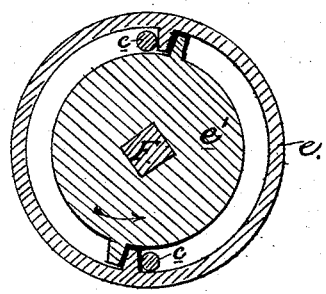
Figure 5:
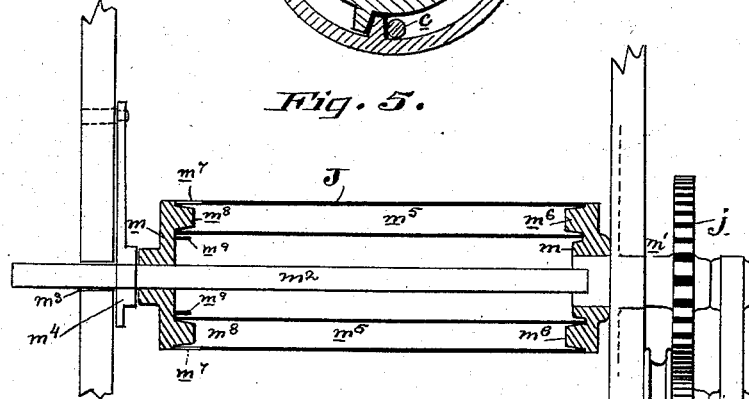
Figure 6:
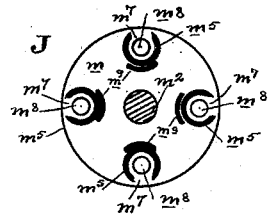

Figure 1 is a side elevation of our machine, showing portions of the frame broken away. Fig. 2 is a plan of the same. Fig. 3 is a longitudinal section of the twister-head and tension-clutch. Fig. 4 is a cross-section of the same. Fig. 5 is a longitudinal section of the reel upon which the fence is wound. Fig. 6 is a cross-section of same. Fig. 7 is a transverse sectional view of the clutch-head.

A is the frame of the machine, having the driving-shaft B, with the fast and loose pulleys $b$.

C are the spools upon which the wires $c$ are wound, and from which they are drawn to encompass and bind the slats D. These wires pass through the twister and tension clutch-heads E. As shown in Figs. 3, 4, and 7, these heads consist of an outer annular ring $e$, in one end of which is a clutch-hub $e'$ engaging it, whereby it is rotated. In the other end is fitted and adapted to slide in grooves therein a cross-shaped piece $e^2$, between the beveled periphery or ends of which and the beveled inner surface of the ring $e$ the wires $c$ pass. The piece is held to its grip on the wires by means of a spring $e^3$, and it has a forwardly-projecting pin or piece $e^4$, by which, as presently described, it is made to relieve the wires when the cross-head H moves back against it. The hub $e'$ is fitted by a square socket to the rotating shafts or spindles F, which carry the wire-spools. It will now be seen that the effect of rotating these spindles is to turn the whole clutch or tension heads E, and thereby twist the wires around the slats, said wires being under tension by the pressure of pieces $e^2$.

Upon the spindles F are secured short brackets Z, which carry guide-rollers $z$, whereby the wires are properly directed from the spools to the twister-heads.

The mechanism by which rotation is imparted to the spindles F is as follows: Mounted at the rear end of the machine is a large gear G, having formed or secured to its side a ratchet $g$, with which a pawl $g'$ on a pivoted arm $g^2$ engages, said arm being operated by means of a rod $g^3$, which is adjustably fitted to a slot in the arm, as shown, so that the stroke of said arm may be varied and the engagement of its pawl take place with more or less teeth, as desired. The rod is reciprocated by means of a crank-bar $g^4$, to which it is secured by a pivoted joint $g^5$, said bar being secured to or formed with a gear $g^6$ on a shaft $g^7$, and which is rotated by means of a pinion $b'$ on the drive-shaft B. The larger spur-gear G meshes with a pinion $g^8$ on a counter-shaft $g^9$, which also carries a gear $g^{10}$, meshing with a pinion $g^{11}$ on the cross-shaft $g^{12}$, mounted across the rear of the machine. Upon this shaft are mounted the beveled pinions $g^{13}$, which mesh with beveled pinions $g^{14}$ on the rear ends of the spindles F. It will thus be seen that a rotary motion is imparted to said spindles, and that the amount of this motion may be varied by means of the adjustable connection between the rod $g^3$ and the swinging arm $g^2$. It will also be seen that by this train of gearing a comparatively small movement of the main gear G, due to the pawl-and-ratchet power, is multiplied so as to produce the required number of revolutions of the spindles F—say three, more or less—so that the wires may be twisted the required number of turns between each slat.

In order to guide each slat to its place between the wires and hold it firmly against the previously-made twist, so as to provide for the twist then to be made, we have a cross-head H, provided with longitudinal slots $h$, through which the wires pass. This bar is provided with a rack-base $h'$, whereby it may be given a reciprocating motion to or from the twister and clutch-head E. This motion is imparted by means of a swinging lever I, having a segmental gear $i$ on its top meshing with the rack-base $h'$. With this lever is adjustably connected, by means of a slot and bolt $i'$, the rod $i^2$, the other end of which is provided with a stud or roll $i^3$, which operates in a cam $i^4$ on the shaft $i^5$, said shaft deriving its motion by means of a pinion $i^6$ upon it meshing with a gear $i^7$ on the shaft $g^7$. It will thus be seen that by reason of the adjustable connection between the rod $i^2$ and the swinging lever I the movement of the guide head or bar H may be varied, and, also, by reason of the cam which controls this movement, it is not a continuous but an intermittent one, to effect the object in view—namely, to allow the bar or guide-head H to remain stationary, so that it holds the slat to its place during the twisting of the wires, and then to make its movement backward toward the twister-head, in order to provide for the introduction of a fresh slat at the proper moment, and then to move forward again and hold said slat to place.

At the forward end of the machine is a reel J, upon which the completed fence is wound. This reel is rotated by means of a gear $j$, which meshes with a pinion $j'$ on a counter-shaft $j^2$, which carries a groove-faced pulley $j^3$, from which a belt $j^4$ extends to a pulley $j^5$ on the drive-shaft B. From this construction it is apparent that if no stop were provided the motion of the reel would be continuous, and its effect would be to draw the fence continually and wind it upon the reel. This is of course not the operation, and in order to provide for the intermittent rotation of the reel we have a stop K. This stop is upon the forward end of the lever L, pivoted in a bracket $l'$, and having its rear end provided with a stud $l^2$, which operates in a cam $l^3$ on the cam-shaft $i^5$. This gives an intermittent movement to the stop K, which temporarily withdraws from before one of the slats and again moves up almost immediately to a position before the next slat; but while in such position it is evident that it stops the travel of the fence, during which time the belt $j^4$, which operates the reel J, slips on its pulleys; but the moment the stop is withdrawn the belt performs its proper function and communicates motion to the reel, whereby the fence is wound thereon until the stop moves up to its position again in front of the next slat. It has heretofore been very difficult to so construct the reel upon which the fence is wound as to provide for the ready removal of the rolls of fence. To accomplish this necessary result, we construct our winding-reel as shown in Figs. 5 and 6. It consists of two heads $m$, one of said heads being upon the shaft $m'$, carrying the gear $j$, while the other head is upon a second shaft $m^2$, the end of which fits in a square socket in the first head. The other end of the shaft $m^2$ fits in an open-mouthed bearing $m^3$, from which it may be lifted. Between the head on shaft $m^2$ and this bearing is a pivoted stop $m^4$, which, when in place, holds the reel together by keeping the shaft $m^2$ to its seat in the opposite head.

The two heads are connected by pipes $m^5$, which at one end fit loosely over lugs $m^6$ on the head and at the other end are slotted at $m^7$, so that they may be easily fitted on lugs $m^8$ on the head, and by a half-turn be held from dropping out, curved guides $m^9$ on the head keeping them from dropping the other way.

Now, when the roll of fence is to be removed from the reel, the pivoted stop $m^4$ is raised, so that the shaft $m^2$ may be withdrawn longitudinally from its seat in the opposite head, whereupon it may be raised out of its bearing $m^3$ and dropped. The pipes $m^5$ may then be readily removed from the lugs on the heads and withdrawn from the roll.

The general operation is as follows: A suitable number of turns is imparted to the twister-heads, which heads by reason of their construction clutch or grip the wires to such an extent as to place them under proper tension, preventing them from unduly slipping through—a tendency which is common to them, which makes them bow over the slats instead of twisting snugly thereon. The mechanism employed for rotating these heads is such that a small amount of motion of the main gear G is multiplied to the required amount on the spindles F. This multiplication of power requires the employment of a train of gearing, which of necessity occupies considerable space. This space we find at the rear end of the machine, and gives us what we term the "tail-drive" of the spindles, which is different from the ordinary means of driving, which takes place at a point close to where the twisting occurs. The cams are so arranged that the movement of the slotted guide bar or head H and the vertically-adjustable stop K are accurately timed for the purpose of permitting the bar to move back to provide space for the reception of a fresh slat at the same time that the stop is released and the motion of the reel to feed the fence takes place. As the cross-bar H moves back, it comes in contact with the pin $e^4$ of the tension-pieces $e^2$, thereby forcing them to release the wires, so that they may be drawn forward to receive the slat, and as the cross-head again moves forward they are relieved and apply the tension once more during the twisting.

Having thus described our invention, what we claim as new, and desire to secure by Letters Patent, is—

1. In a fence-making machine, the spools carrying the wires and the twisting-spindles by which the spools are carried, in combination with a pawl and ratchet, power mechanism for operating the pawl and ratchet, and gearing by which the power of the ratchet is transmitted to the spindles, whereby a limited motion of the ratchet is multiplied to effect the necessary number of turns of the spindles to twist the wires, substantially as herein described.

2. In a fence-making machine, the spools carrying the wires and the twisting-spindles by which the spools are carried, in combination with the means for rotating the spindles, consisting of a power-shaft having a crank-wheel, a swinging pawl, an adjustable connecting-rod between the pawl and the crank-wheel, a ratchet with which the pawl engages, and gearing between the ratchet and the rear ends of the spindles, substantially as described.

3. In a fence-making machine, a twister-head and tension-clutch for the wires, consisting of an outer ring through which the wires pass, a hub-clutch by which it is rotated, and a sliding tension-piece within the ring binding on the wires normally and adapted by its movement to relieve them, substantially as herein described.

4. In a fence-making machine, a twister-head and tension-clutch for the wires, consisting of an outer ring through which the wires pass, a hub-clutch by which the ring is rotated, a sliding bevel-ended tension-piece within the ring, and a spring causing the tension-piece to bind on the wires, substantially as herein described.

5. In a fence-making machine, a twister-head and tension-clutch for the wires, consisting of an outer ring through which the wires pass, a hub-clutch by which the ring is rotated, a sliding bevel-ended tension-piece within the ring, a spring forcing it to bind on the wires, and a projecting pin, in combination with a moving cross-head coming in contact with the pin, whereby the tension-piece is forced to release the wires, substantially as herein described.

6. In a fence-making machine, the twister-head and tension-clutch consisting of the outer ring, the hub-clutch, and the sliding spring and actuated tension-piece within the outer ring, in combination with the rotating spindle fitted to the hub-clutch, whereby the twister-head is rotated, substantially as described.

7. In a fence-making machine, the movable cross-head H, before which the slat is inserted and forced and held against the previous twist, in combination with the means for operating said cross-head, comprising the rack and segmental gear, the swinging arm or lever, the cam, and the connecting-rod, substantially as herein described.

8. In a fence-making machine, the combination of rotating spindles, spools for carrying wire, twister-heads and tension-clutches comprising outer rings, hub-clutches and tension-pieces within said outer rings, and a sliding cross-head for forcing and holding the slat against the previous twist while the wires are twisting and releasing the clutch, substantially as described.

9. In a fence-making machine, the reel consisting of a head fixed on the drive-shaft, a head fixed on a removable shaft, one end of which is mounted in a bearing from which it can be removed and the other end is loosely fitted in a square socket in the first head, a pivoted stop for holding the removable shaft in place, and removable pipes fitted on lugs on the two heads, substantially as described.

10. In a fence-making machine, the reel consisting of the independent heads mounted on separate shafts, one of which is removable, and the pipes fitted on lugs on one head and having slots by which they are fitted on lugs on the other head, and fixed guides on said head by which the pipes are held to place, the whole being arranged so that the reel may be readily taken to pieces and put together again, substantially as described.

In witness whereof we have hereunto set our hands.

THOMAS L. ARMSTRONG.
EDWARD CLARK.
GEORGE COTTRELL.

Witnesses:
S. H. NOURSE,
H. C. LEE.